United States Patent
Waku et al.

(10) Patent No.: US 8,700,278 B2
(45) Date of Patent: Apr. 15, 2014

(54) IDLE STOP VEHICLE AND CONTROL METHOD THEREOF

(75) Inventors: Kousuke Waku, Hadano (JP); Hideshi Wakayama, Hadano (JP); Masayuki Miyazono, Isehara (JP); Naohiro Yamada, Atsugi (JP)

(73) Assignee: Jatco Ltd, Fuji-shi (JP)

( * ) Notice: Subject to any disclaimer, the term of this patent is extended or adjusted under 35 U.S.C. 154(b) by 148 days.

(21) Appl. No.: 13/187,001

(22) Filed: Jul. 20, 2011

(65) Prior Publication Data

US 2012/0035817 A1    Feb. 9, 2012

(30) Foreign Application Priority Data

Aug. 5, 2010    (JP) ................................ 2010-176097

(51) Int. Cl.
*B60W 10/06*    (2006.01)

(52) U.S. Cl.
USPC ........................................... 701/54; 701/102

(58) Field of Classification Search
USPC .................................................. 701/54, 102
See application file for complete search history.

(56) References Cited

U.S. PATENT DOCUMENTS

| | | | | |
|---|---|---|---|---|
| 6,526,931 | B1* | 3/2003 | Vilou | 123/179.4 |
| 2002/0117338 | A1* | 8/2002 | Itou | 180/54.1 |
| 2003/0045988 | A1* | 3/2003 | Suzuki et al. | 701/54 |
| 2004/0046394 | A1* | 3/2004 | Lim | 290/40 C |

FOREIGN PATENT DOCUMENTS

| | | |
|---|---|---|
| DE | 10 2007 009 831 A1 | 9/2008 |
| EP | 1 469 195 A1 | 10/2004 |
| JP | 2002-371876 A | 12/2002 |

* cited by examiner

*Primary Examiner* — Fadey Jabr
*Assistant Examiner* — Yazan A Soofi
(74) *Attorney, Agent, or Firm* — Foley & Lardner LLP

(57) ABSTRACT

An idle stop vehicle performs an idle stop to automatically stop an engine during a stop of the vehicle. The vehicle includes an idle stop condition determination unit for determining whether or not an idle stop condition holds, and an engine control unit for performing the idle stop when the idle stop condition holds before a stoppage time exceeds a specified time and prohibiting the idle stop after the stoppage time exceeds the specified time without the idle stop condition holding.

13 Claims, 9 Drawing Sheets

IDLE STOP VEHICLE AND CONTROL METHOD THEREOF

FIELD OF THE INVENTION

The present invention relates to an idle stop vehicle in which an engine is automatically stopped during a stop of the vehicle.

BACKGROUND OF THE INVENTION

Idle stop vehicles have been put to practical use which vehicles automatically stop an engine when a predetermined idle stop condition holds during a stop of the vehicle to improve fuel economy by suppressing a fuel consumption amount during the stop of the vehicle (JP2002-371876A).

In determining whether or not an idle stop condition holds, a vehicle speed condition, depressed states of a brake pedal and an accelerator pedal, a water temperature condition of an engine, an oil temperature condition of a transmission and other conditions are judged. When 211 the conditions hold, the idle stop condition is determined to hold.

SUMMARY OF THE INVENTION

A period until the above idle stop condition holds after the vehicle stops varies due to various factors, wherefore a period until the engine automatically stops also varies.

An exemplary case is such that the oil temperature of the transmission having been outside a temperature range where an idle stop is permitted changes to enter the temperature range where the idle stop is permitted. A timing at which the oil temperature of the transmission enters the temperature range where the idle stop is permitted cannot be actively controlled, with the result that a period until the idle stop condition holds and the engine automatically stops varies.

However, if the period until the engine automatically stops largely varies, a sense of incongruity is given to a driver. Particularly, if a period until the engine automatically stops after a stop of the vehicle becomes longer such as when the engine automatically stops eventually after the elapse of 3 seconds following a stop of the vehicle in certain cases although the engine automatically stops within less than 1 second after a stop of the vehicle in many cases, the driver feels a sense of incongruity.

The present invention was developed in view of such technical problems and aims to reduce a sense of incongruity given to a driver by a variation of a period from a stop of a vehicle to an automatic stop of an engine.

According to an aspect of the present invention, an idle stop vehicle which performs an idle stop to automatically stop an engine during a stop of the vehicle is provided. The vehicle includes an idle stop condition determination unit which determines whether or not an idle stop condition holds, and an engine control unit which performs the idle stop when the idle stop condition holds before a stoppage time exceeds a specified time and prohibits the idle stop after the stoppage time exceeds the specified time without the idle stop condition holding.

According to another aspect of the present invention, a control method for a vehicle which performs an idle stop to automatically stop an engine during a stop of the vehicle is provided. The method includes determining whether or not an idle stop condition holds, and performing the idle stop when the idle stop condition holds before a stoppage time exceeds a specified time and prohibiting the idle stop after the stoppage time exceeds the specified time without the idle stop condition holding.

Embodiments and advantages of this invention will be described in detail below with reference to the attached figures.

DESCRIPTION OF THE PREFERRED EMBODIMENTS

Hereinafter, embodiments of the present invention are described with reference to the accompanying drawings. In the following description, a "speed ratio" of a certain transmission is a value obtained by dividing an input rotation speed of this transmission by an output rotation speed thereof. A "lowest speed ratio" means a maximum speed ratio of this transmission and a "highest speed ratio" means a minimum speed ratio thereof.

Figure 1:
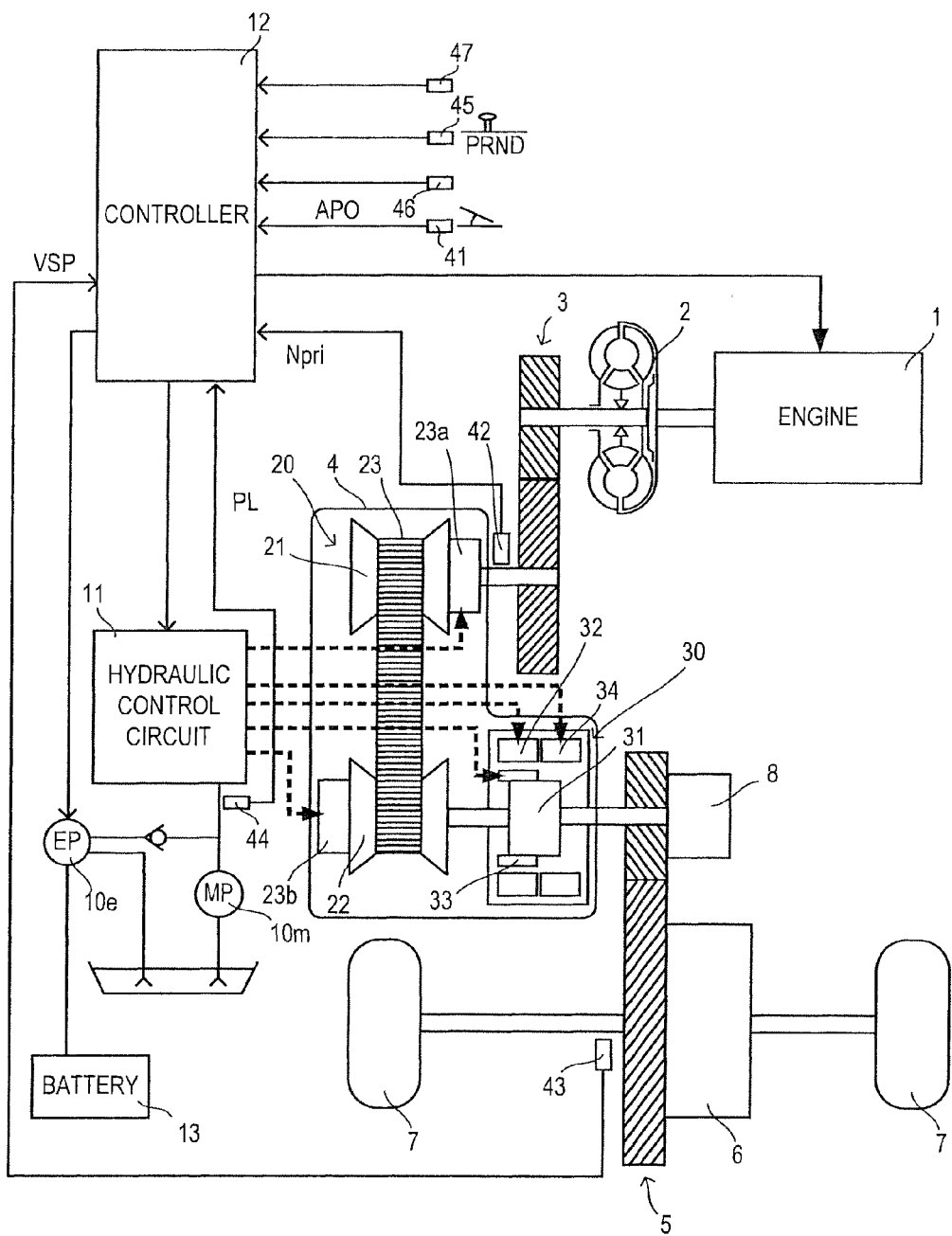
FIG. 1 is a schematic construction diagram of an idle stop vehicle according to a first embodiment of the present invention.

FIG. 1 is a schematic construction diagram of an idle stop vehicle according to a first embodiment of the present invention. This vehicle includes an engine 1 as a driving source, and output rotation of the engine 1 is transmitted to drive wheels 7 via a torque converter 2 with a lock-up clutch, a first gear train 3, a continuously variable transmission (hereinafter, merely referred to as a "transmission 4"), a second gear train 5 and a final reduction unit 6. The second gear train 5 includes a parking mechanism 8 for mechanically locking an output shaft of the transmission 4 in a parked state so as not to be able to rotate.

The transmission 4 includes a mechanical oil pump 10m to which the rotation of the engine 1 is input and which is driven by utilizing a part of power of the engine 1 and an electrical oil pump 10e which is driven upon receiving the supply of power from a battery 13. The electrical oil pump 10e is composed of an oil pump main body and an electric motor and a motor driver for driving and rotating the oil pump main body, and can control a driving load to an arbitrary load or in multiple stages. The transmission 4 includes a hydraulic control circuit 11 for adjusting a hydraulic pressure (hereinafter, referred to as a "line pressure PL") from the mechanical oil pump 10m or the electrical oil pump 10e and supplying the adjusted hydraulic pressure to the respective parts of the transmission 4.

The transmission 4 includes a belt-type continuously variable transmission mechanism (hereinafter, referred to as a "variator 20") and a sub-transmission mechanism 30 provided in series with the variator 20. "To be provided in series" means that the variator 20 and the sub-transmission mechanism 30 are provided in series in a power transmission path from the engine 1 to the drive wheels 7. The sub-transmission mechanism 30 may be directly connected to an output shaft of the variator 20 as in this example or may be connected via another transmission or power transmission mechanism (e.g. gear train). Alternatively, the sub-transmission mechanism 30 may be connected to a stage (input shaft side) before the variator 20.

The variator 20 includes a primary pulley 21, a secondary pulley 22 and a V-belt 23 mounted between the pulleys 21 and 22. Each of the pulleys 21, 22 includes a fixed conical plate, a movable conical plate arranged with a sheave surface faced toward the fixed conical plate and forming a V-groove between the fixed conical plate and the movable conical plate, and a hydraulic cylinder 23a, 23b provided on the back surface of the movable conical plate for displacing the movable conical plate in an axial direction. When hydraulic pressures supplied to the hydraulic cylinders 23a, 23b are adjusted, the width of the V-groove changes to change contact radii of the V-belt 23 and the respective pulleys 21, 22, whereby a speed ratio of the variator 20 continuously changes.

The sub-transmission mechanism 30 is a transmission mechanism with two forward speeds and one reverse speed. The sub-transmission mechanism 30 includes a Ravigneaux-type planetary gear mechanism 31 in which carriers of two planetary gears are coupled, and a plurality of frictional engagement elements (low brake 32, high clutch 33, reverse brake 34) which are connected to a plurality of rotation elements constituting the Ravigneaux-type planetary gear mechanism 31 to change coupled states of these rotation elements. If the supply of hydraulic pressures to the respective frictional engagement elements 32 to 34 are adjusted to change engaged and released states of the respective frictional engagement elements 32 to 34, a gear position of the sub-transmission mechanism 30 is changed.

For example, the sub-transmission mechanism 30 is set to a first gear position if the low brake 32 is engaged and the high clutch 33 and the reverse brake 34 are released. The sub transmission mechanism 30 is set to a second gear position with a gear ratio smaller than in the first gear position if the high clutch 33 is engaged and the low brake 32 and the reverse brake 34 are released. The sub-transmission mechanism 30 is set to a reverse gear position if the reverse brake 34 is engaged and the low brake 32 and the high brake 33 are released. In the following description, a case where the sub-transmission mechanism 30 is in the first gear position is expressed by that "the transmission 4 is in a low-speed mode" and a case where the sub-transmission mechanism is in the second gear position is expressed by that "the transmission 4 is in a high-speed mode".

Figure 2:
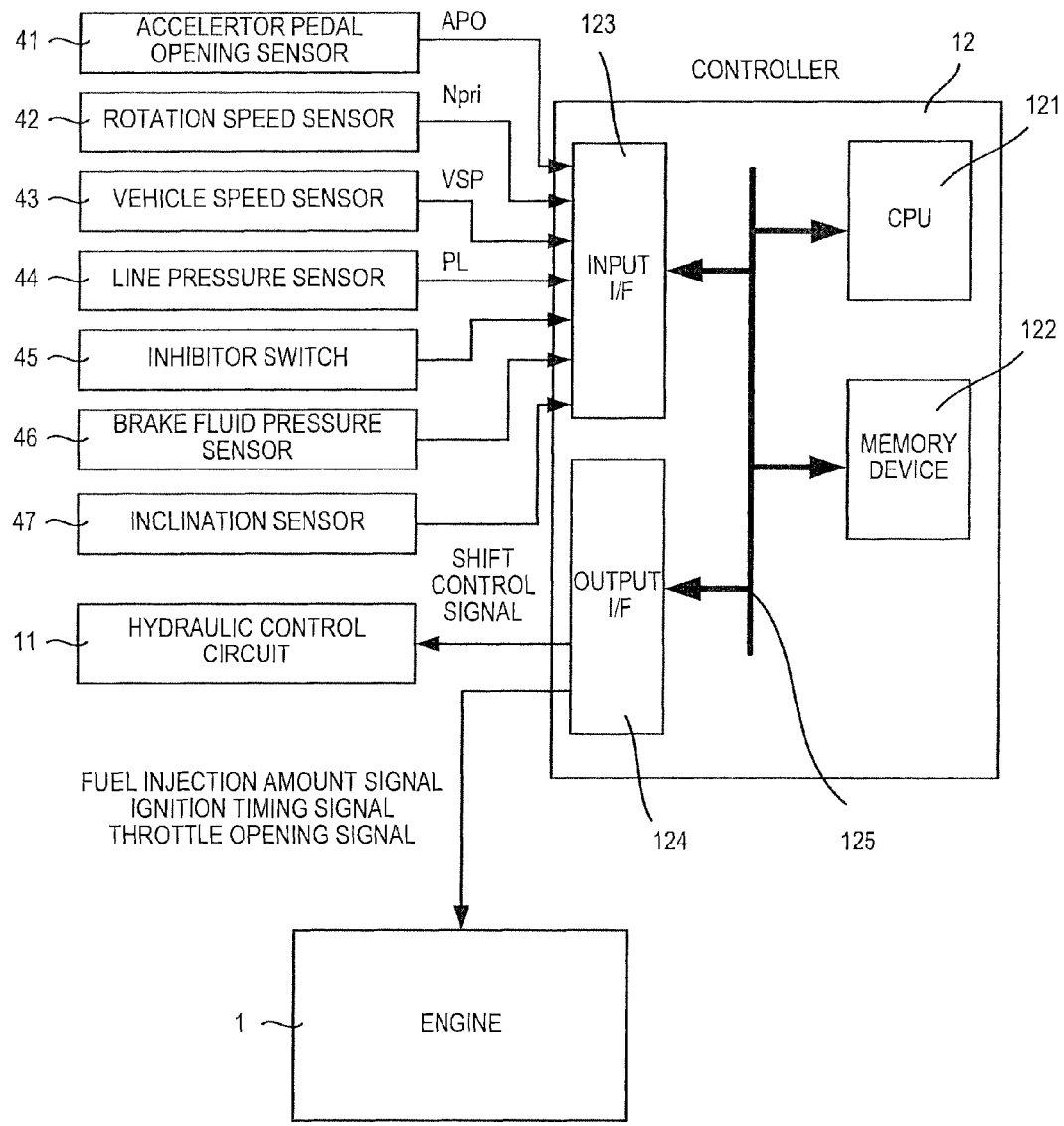
FIG. 2 is a diagram showing the internal construction of a controller.

A controller 12 is the one for controlling the engine 1 and the transmission 4 in a comprehensive manner and includes a CPU 121, a memory device 122 composed of a RAM/ROM, an input interface 123, an output interface 124 and a bus 125 which connects these components to each other as shown in FIG. 2.

To the input interface 123 are input an output signal of an accelerator pedal opening sensor 41 for detecting an accelerator pedal opening APO which is an operated amount of an accelerator pedal, an output signal of a rotation speed sensor 42 for detecting an input rotation speed of the transmission 4 (=rotation speed of the primary pulley 21, hereinafter, referred to as a "primary rotation speed Npri"), an output signal of a vehicle speed sensor 43 for detecting a vehicle speed VSP, an output signal of a line pressure sensor 44 for detecting the line pressure PL, an output signal of an inhibitor switch 45 for detecting the position of a select lever, output signals of a brake fluid pressure sensor 46 for detecting a brake fluid pressure and an inclination sensor 47 for detecting the inclination of the vehicle (≈ road surface gradient) and like output signals.

A control program of the engine 1, a shift control program of the transmission 4, and various maps and tables used in these programs are stored in the memory device 122. The CPU 121 reads a program stored in the memory device 122 and implements it, performs various computations on various signals input via the input interface 123 to generate a fuel injection amount signal, an ignition timing signal, a throttle opening signal, a shift control signal and a drive signal of the electrical oil pump 10e, and outputs the generated signals to the engine 1, the hydraulic control circuit 11 and the motor driver of the electrical oil pump 10e via the output interface 124. Various values used in the computations by the CPU 121 and computation results are appropriately stored in the memory device 122.

The hydraulic control circuit 11 includes a plurality of flow passages and a plurality of hydraulic control valves. In accordance with the shift control signal from the controller 12, the hydraulic control circuit 11 controls the plurality of hydraulic control valves to switch supply paths of the hydraulic pressure, prepares a necessary hydraulic pressure from a hydraulic pressure produced in the mechanical oil pump 10m or the electrical oil pump 10e, and supplies this hydraulic pressure to the respective components of the transmission 4. In this way, the speed ratio of the variator 20 and gear position of the sub-transmission mechanism 30 are changed to shift the transmission 4.

Figure 3:
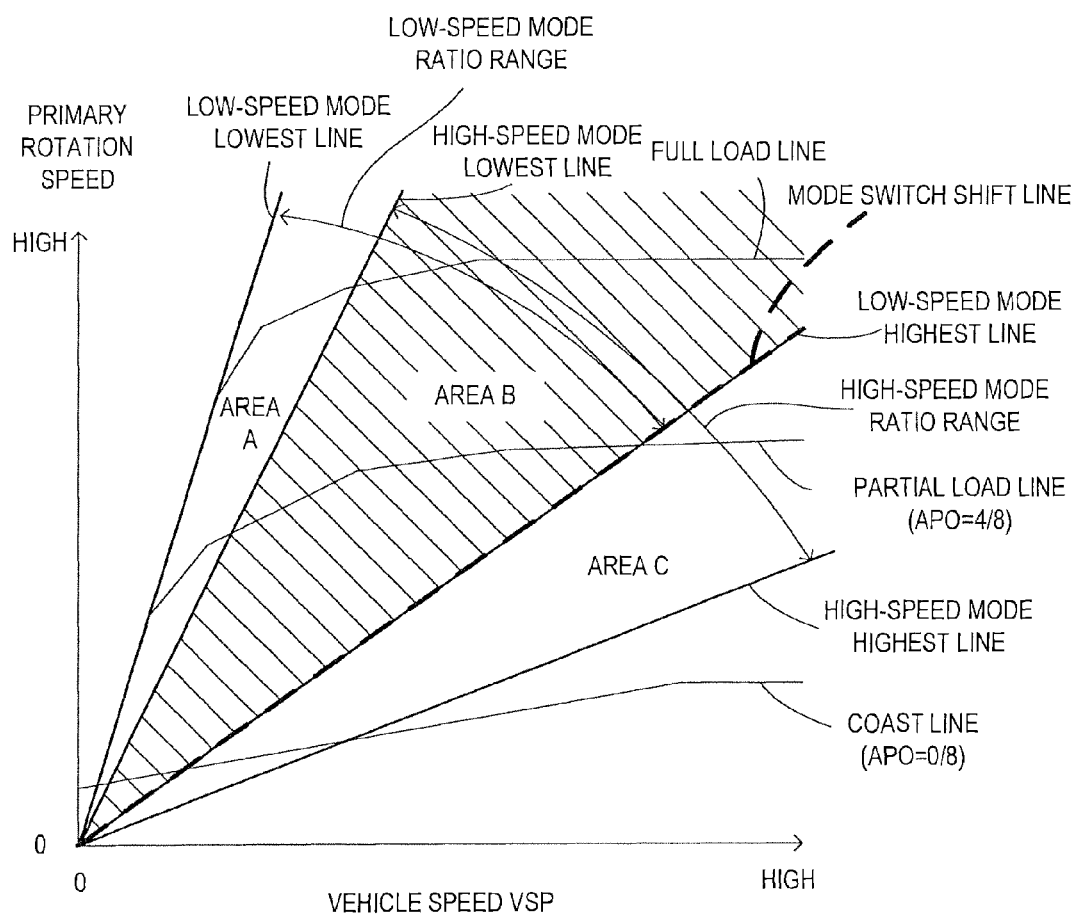
FIG. 3 is a graph showing an example of a shift map.

FIG. 3 shows an example of a shift map stored in the memory device 122. The controller 12 controls the variator 20 and the sub-transmission mechanism 30 according to a driving state of the vehicle (vehicle speed VSP, primary rotation speed Npri, accelerator pedal opening APO) in accordance with this shift map.

In this shift map, an operating point of the transmission 4 is defined by the vehicle speed VSP and the primary rotation speed Npri. The inclination of a line connecting the operating point of the transmission 4 and a zero point at the lower left corner of the shift map corresponds to the speed ratio of the transmission 4 (overall speed ratio obtained by multiplying the speed ratio of the variator 20 by that of the sub-transmission mechanism 30, hereinafter, referred to as a "through speed ratio"). In this shift map, a shift line is set for each accelerator pedal opening APO similar to a shift map of a conventional belt-type continuously variable transmission, and the transmission 4 is shifted in accordance with the shift line selected based on the accelerator pedal opening APO. For simplicity, only a full load line (shift line when the accelerator pedal opening APO=8/8), a partial load line (shift line when the accelerator pedal opening APO=4/8) and a coast line (shift line when the accelerator position APO=0/8) are shown in FIG. 3.

When being in the low-speed mode, the transmission 4 can be shifted between a low-speed mode lowest line obtained by setting the speed ratio of the variator 20 to the lowest speed ratio and a low-speed mode highest line obtained by setting the speed ratio of the variator 20 to the highest speed ratio. In this case, the operating point of the transmission 4 moves in areas A and B. On the other hand, when being in the high-speed mode, the transmission 4 can be shifted between a high-speed mode lowest line obtained by setting the speed ratio of the variator 20 to the lowest speed ratio and a high-speed mode highest line obtained by setting the speed ratio of the variator 20 to the highest speed ratio. In this case, the operating point of the transmission 4 moves in areas B and C.

The speed ratio of each gear position of the sub-transmission mechanism 30 is so set that the speed ratio corresponding to the low-speed mode highest line (low-speed mode highest speed ratio) is smaller than the speed ratio corresponding to the high-speed mode lowest line (high-speed mode lowest speed ratio). By this, a range of the through speed ratio of the transmission 4 that can be set in the low-speed mode ("low-speed mode ratio range" in FIG. 3) and that of the through speed ratio of the transmission 4 that can be set in the high-speed mode ("high-speed mode ratio range" in FIG. 3) partly overlap, and the transmission 4 can be selectively set in either one of the low-speed mode or the high-speed mode if the operating point of the transmission 4 is in the area B defined between the high-speed mode lowest line and the low-speed mode highest line.

On this shift map, a mode switch shift line at which the sub-transmission mechanism 30 is shifted is so set as to overlap the low-speed mode highest line. The through speed ratio corresponding to the mode switch shift line (hereinafter, referred to as a "mode switch speed ratio mRatio") is set at a value equal to the low-speed mode highest speed ratio. The mode switch shift line is set in this way because an input torque to the sub-transmission mechanism 30 decreases as the speed ratio of the variator 20 decreases and a shift shock at the time of shifting the sub-transmission mechanism 30 is suppressed.

When the operating point of the transmission 4 crosses the mode switch shift line, i.e. an actual value of the through speed ratio (hereinafter, referred to as an "actual through speed ratio" Ratio") changes over the mode switch speed ratio mRatio, the controller 12 performs a synchronization shift described below to switch between the high-speed mode and the low-speed mode.

In the synchronization shift, the controller 12 shifts the sub-transmission mechanism 30 and changes the speed ratio of the variator 20 in a direction opposite to a direction in which the speed ratio of the sub-transmission mechanism 30 is changed. At this time, an inertia phase in which the speed ratio of the sub-transmission mechanism 30 actually changes and a period during which the speed ratio of the variator 20 changes are synchronized. The speed ratio of the variator 20 is changed in the direction opposite to the direction in which the speed ratio of the sub-transmission mechanism 30 is changed to prevent a change in the input rotation caused by a step in the actual through speed ratio Ratio from giving a sense of incongruity to a driver.

Specifically, when the actual through speed ratio Ratio of the transmission 4 changes from a low side to a high side over the mode switch speed ratio mRatio, the controller 12 changes the gear position of the sub-transmission mechanism 30 from the first gear position to the second gear position (1-2 shift) and changes the speed ratio of the variator 20 to the low side.

Conversely, when the actual through speed ratio Ratio of the transmission 4 changes from the high side to the low side over the mode switch speed ratio mRatio, the controller 12 changes the gear position of the sub-transmission mechanism 30 from the second gear position to the first gear position (2-1 shift) and changes the speed ratio of the variator 20 to the high side.

According to this shift map, the sub-transmission mechanism 30 is set to the first gear position when the vehicle decelerates and stops. However, the vehicle can more smoothly stop when being stopped with the second gear position set than when the synchronization shift is performed in a low-speed region. Thus, the vehicle may stop with the second gear position set without performing the 2-1 shift. In this case, the 2-1 shift of the sub-transmission mechanism 30 is performed after the vehicle stops, so that a sufficient start driving force can be obtained when the vehicle starts again.

To suppress a fuel consumption amount during a stop of the vehicle and improve fuel economy, the controller 12 performs an idle stop control described below.

<Idle Stop Control>

The idle stop control is a control for suppressing the fuel consumption amount by automatically stopping the engine 1 (idle stop) during a stop of the vehicle.

Upon performing an idle stop, the controller 12 determines conditions a1 to a8 listed below.

a1: vehicle is in a stopped state (VSP=0);
a2: brake pedal is depressed (brake fluid pressure is equal to or higher than a predetermined value);
a3: accelerator pedal is not depressed at all (accelerator pedal opening APO=0);
a4: water temperature of the engine 1 is in a predetermined range Xe;
a5: oil temperature of the transmission 4 is in a predetermined range Xt;
a6: inclination of a vehicle body road surface gradient) is equal to or smaller than a predetermined value;
a7: rotation speed of the electrical oil pump 10*e* is equal to or smaller than a predetermined value (not excessively rotated);
a8: sub-transmission mechanism is in the first gear position (after the 2-1 shift when the vehicle stops with the second gear position set).

Then, the controller 12 deter mines that an idle stop condition holds and permits an idle stop to automatically stop the engine 1 when all of these conditions a1 to a8 hold.

A lower limit value of the predetermined range Xe of the water temperature of the engine 1 is set at a temperature at which warm-up of the engine 1 is already finished, and an upper limit value thereof is set at the lower limit of a high temperature region where after idle of the engine 1 is necessary.

During the idle stop, it is necessary to drive the electrical oil pump 10*e* instead of the mechanical oil pump 10*m* and engage the frictional engagement elements of the transmission 4 with a hydraulic pressure produced in the electrical oil pump 10*e*. Accordingly, the predetermined range Xt of the oil temperature of the transmission 4 is set at a temperature range where the electrical oil pump 10*e* can normally rotate in view of the viscosity of operating oil.

The idle stop is performed under the predetermined condition in this way. If the idle stop condition does not hold during a stop of the vehicle and the idle stop condition holds after a while following the stop of the vehicle and the idle stop is performed at a delayed timing, a sense of incongruity is given to a driver.

Thus, the controller 12 measures a stoppage time (elapsed time after the vehicle speed VSP becomes zero) and, if the stoppage time exceeds a specified time TLIM without the idle stop condition holding, prohibits the idle stop and allows the engine 1 to continue to operate.

The following factors are thought as factors due to which the idle stop condition holds after a while following the stop of the vehicle.

The idle stop is prohibited during the stop of the vehicle since the water temperature of the engine 1 or the oil temperature of the transmission 4 is outside the temperature range where the idle stop is permitted, but these values changes thereafter to enter the temperature range where the idle stop is permitted.

The idle stop is prohibited during the stop of the vehicle since the inclination (≈ road surface gradient) of the vehicle body during the stop of the vehicle is almost a minimum inclination at which the idle stop is prohibited but, thereafter, the detected inclination changes to an inclination at which the idle stop is permitted due to a movement of a passenger or baggage.

If the brake is weakly depressed during the stop of the vehicle or depression of the brake is loosened before the idle stop, the brake fluid condition does not hold and, hence, the idle stop is not performed. If the brake is further depressed in a state where the idle stop is not performed, the fluid pressure condition holds and the idle stop is permitted. Also in this case, the idle stop condition holds after a while following the stop of the vehicle.

The controller 12 determines whether or not the above conditions a1 to a8 respectively continue to hold even during the idle stop, and determines that the idle stop condition does not hold and ends the idle stop, i.e. restarts the engine 1 if even one of them no longer holds.

Figure 4:
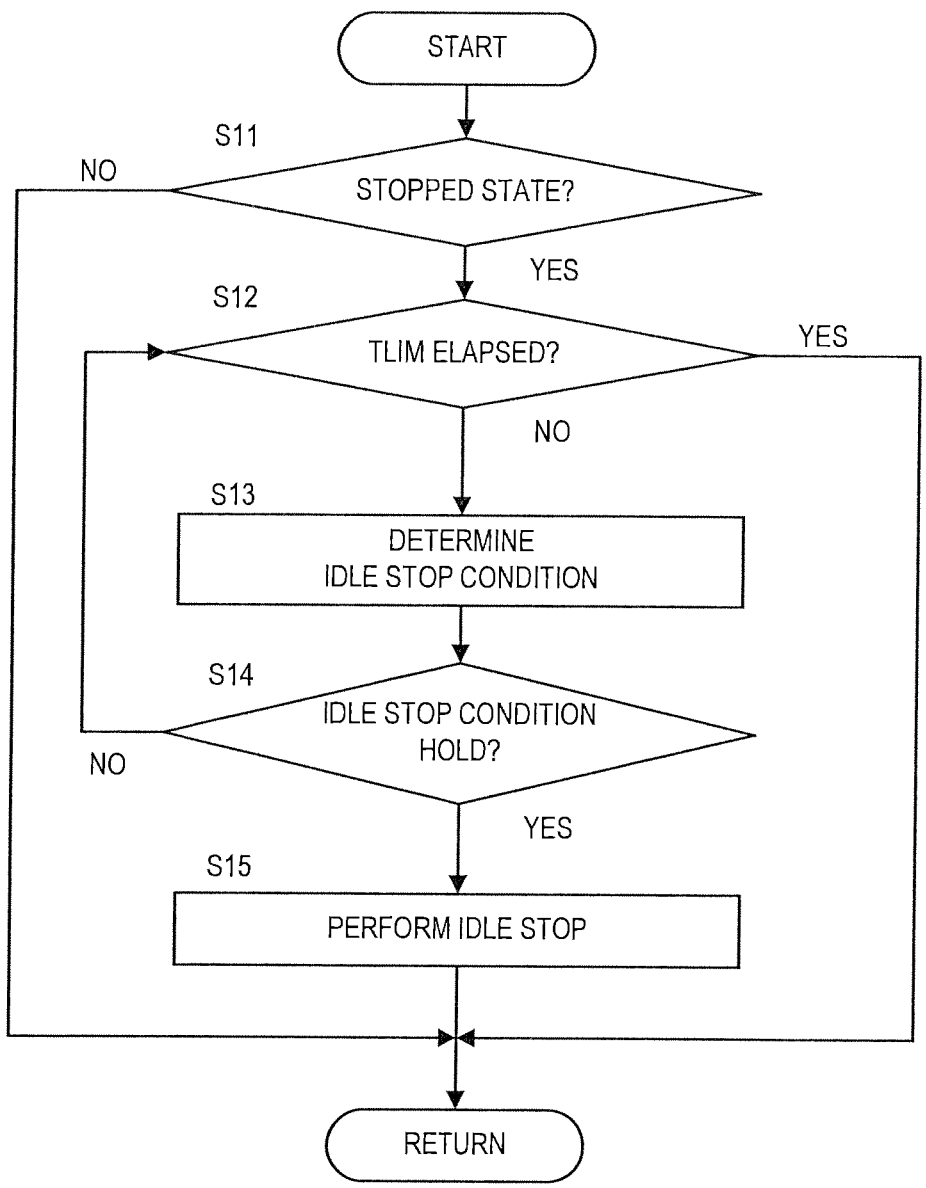
FIG. 4 is a flow chart showing the content of an idle stop control performed by the controller (first embodiment).

FIG. 4 is a flow chart showing the content of the idle stop control performed by the controller 12. The idle stop control is further described with reference to FIG. 4. This flow chart is repeatedly performed at every interval of a specified time (e.g. every 10 msec.).

In S11, the controller 12 determines whether or not the vehicle is in a stopped state (VSP=0). A process proceeds to S12 if the vehicle is in the stopped state while ending unless otherwise. When the process proceeds from S11 to S12 for the first time, a timer for measuring a stoppage time is started.

In S12, the controller 12 deter mines whether or not the stoppage time has exceeded the specified time TLIM. The process proceeds to S13 if the stoppage time is not in excess of the specified time TLIM while ending if the stoppage time is in excess of the specified time TLIM. The specified time TLIM is set at a time which is longer than an average time until the idle stop condition holds after the stop of the vehicle and after the elapse of which the idle stop gives a sense of incongruity to a driver and, for example, set at a value of about 1 sec.

In S13, the controller 12 determines the idle stop condition. Specifically, the controller 12 determines whether or not each of the above conditions a1 to a8 holds.

In S14, the controller 12 determines whether or not the idle stop condition holds. The controller 12 determines that the idle stop condition holds when all the above conditions a1 to a8 hold. The process proceeds to S15 if the idle stop condition is determined to hold while returning to S12 unless otherwise, whereby S12 to S14 are repeated until the stoppage time exceeds the specified time TLIM.

In S15, the controller 12 performs the idle stop. In other words, the controller 12 stops fuel supply to the engine 1 to stop the engine 1.

Figure 5A:
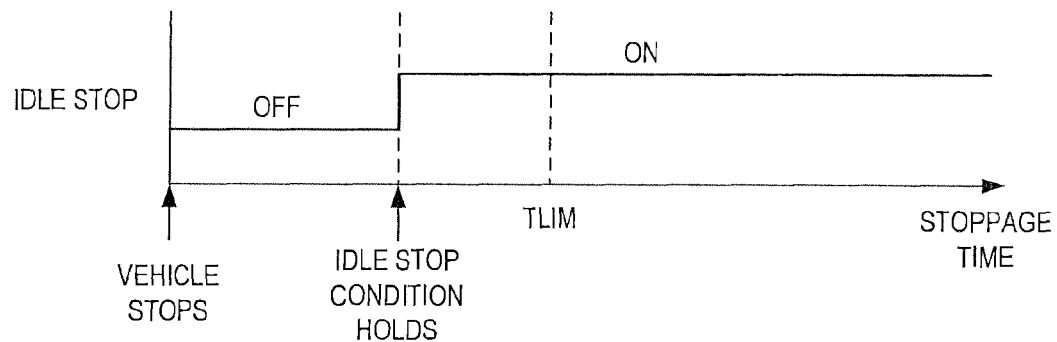
FIGS. 5A and 5B are time charts showing functions and effects of the first embodiment.
Figure 5B:
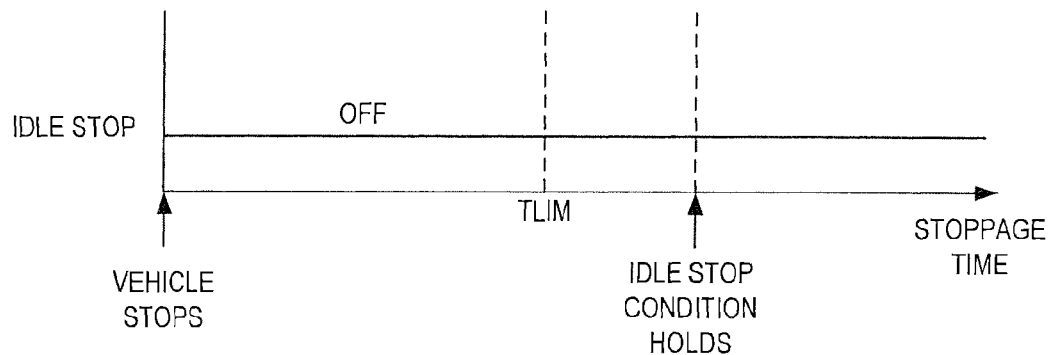

According to the above process, if the idle stop condition holds before the stoppage time exceeds the specified time TLIM, the idle stop is performed at a timing at which the idle stop condition holds (FIG. 5A). However, after the stoppage time exceeds the specified time TLIM without the idle stop condition holding, the idle stop is prohibited and the operation of the engine 1 is continued regardless of whether or not the idle stop condition holds (FIG. 5B).

In other words, the idle stop is performed before the stoppage time exceeds the specified time TLIM, but is not performed after the stoppage time exceeds the specified time TLIM without the idle stop condition holding. Thus, a sense of incongruity caused by a variation of a timing at which the idle stop is performed can be alleviated.

The prohibition of the idle stop is valid only during the stop of the vehicle during which this prohibition is judged, and lifted when it is judged that the vehicle has started again (is not in the stopped state).

Next, a second embodiment of the present invention is described.

In the second embodiment, a neutral idle control (hereinafter, referred to as an "N idle control") is performed under a predetermined condition in addition to the idle stop control to suppress a fuel consumption amount during a stop of a vehicle and further improve fuel economy. The overall construction of the vehicle is as in the first embodiment.

<N Idle Control>

The N idle control is a control for suppressing a fuel consumption amount by reducing a transmittable torque of a low brake 32 by reducing a hydraulic pressure supplied to the low brake 32, which is a frictional engagement element for start, to a hydraulic pressure at which the low brake 32 is almost engaged (state where facing engaging members constituting the low brake 32 are slightly in contact or in a state immediately before coming into contact) to reduce loads of an engine 1 and a mechanical oil pump 10m during a stop of the vehicle. Although an example in which the hydraulic pressure is reduced until the low brake 32 reaches the almost engaged state is described here, any control may be performed provided that it reduces the transmittable torque below a torque of the engine 1. For example, the hydraulic pressure may be reduced until the low brake 32 reaches, for example, a state where it slightly slips.

Upon performing the N idle control, the controller 12 determines conditions b1 to b7 listed below.

b1: vehicle is in a stopped state (VSP=0);
b2: brake pedal is depressed (brake fluid pressure is equal to or higher than a predetermined value);
b3: accelerator pedal is not depressed at all (accelerator pedal opening APO=0);
b4: water temperature of the engine 1 is in a predetermined range Ye;
b5: oil temperature of the transmission 4 is in a predetermined range Yt;
b6: inclination of a vehicle body (≈ road surface gradient) is equal to or smaller than a predetermined value;
b7: sub-transmission mechanism is in a first gear position (after a 2-1 shift when the vehicle stops with a second gear position set).

Then, the controller 12 deter mines that the N idle condition holds, permits the N idle control and sets the transmission 4 in an N idle state by reducing the hydraulic pressure supplied to the low brake 32 when all of these conditions b1 to b7 hold.

The predetermined range Ye of the water temperature of the engine 1 is set at a temperature range where the engine 1 can stably rotate, wherein a lower limit value thereof is set lower than that of the predetermined range Xe and an upper limit value thereof is set higher than that of the predetermined range Xe. In other words, the predetermined range Ye is wider than the predetermined range Xe and includes the predetermined range Xe.

The predetermined range Yt of the oil temperature of the transmission 4 is set at a temperature range where desired hydraulic responsiveness can be realized when the vehicle starts again, wherein a lower limit value thereof is set lower than that of the predetermined range Xt and an upper limit value thereof is set higher than that of the predetermined range Ye. In other words, the predetermined range Yt is wider than the predetermined range Xt and includes the predetermined range Xt.

The idle stop condition and the N idle condition are substantially the same conditions, but the water temperature condition of the engine 1 and the oil temperature condition of the transmission 4 differ as described above. Thus, the N idle condition normally holds at an earlier timing than the idle stop condition.

The controller 12 also determines whether or not the above conditions b1 to b7 continue to hold during the N idle control, and determines that the N idle condition does not hold and ends the N idle control, i.e. completely engages the low brake 32 if even one of them no longer holds.

Also in the second embodiment, similar to the first embodiment, the idle stop is performed when the idle stop condition holds before the stoppage time exceeds the specified time TLIM, and is not performed even if the idle stop condition holds when the stoppage time exceeds the specified time TLIM without the idle stop condition holding.

In the second embodiment, the N idle condition is determined and the N idle control is performed. Even if the N idle condition holds before the stoppage time exceeds the specified time TLIM and when the idle stop condition does not hold yet, the N idle control is not immediately performed and first performed when the stoppage time reaches the specified time TLIM.

The N idle control is not performed until the stoppage time reaches the specified time TLIM even if the N idle condition holds in order to avoid a shock caused by a switch from the N idle state to an idle stop state by performing only the idle stop depending on whether or not the idle stop condition holds until the stoppage time exceeds the specified time TLIM.

The shock occurs at the time of the above switch for the following reason. The low brake 32 is controlled to be in the almost engaged state in the N idle control, whereas the low brake 32 is completely engaged during the idle stop to ensure responsiveness at the time of restart and, hence, the hydraulic pressure supplied to the low brake 32 is suddenly switched.

The idle stop is not performed as described above even if the idle stop condition holds after the stoppage time exceeds the specified time TLIM. However, the N idle control is performed if the N idle condition holds after the stoppage time exceeds the specified time TLIM. This is because a driver hardly recognizes the start of the N idle control and no sense of incongruity is given to the driver at whichever timing the N idle control is performed.

Figure 6:
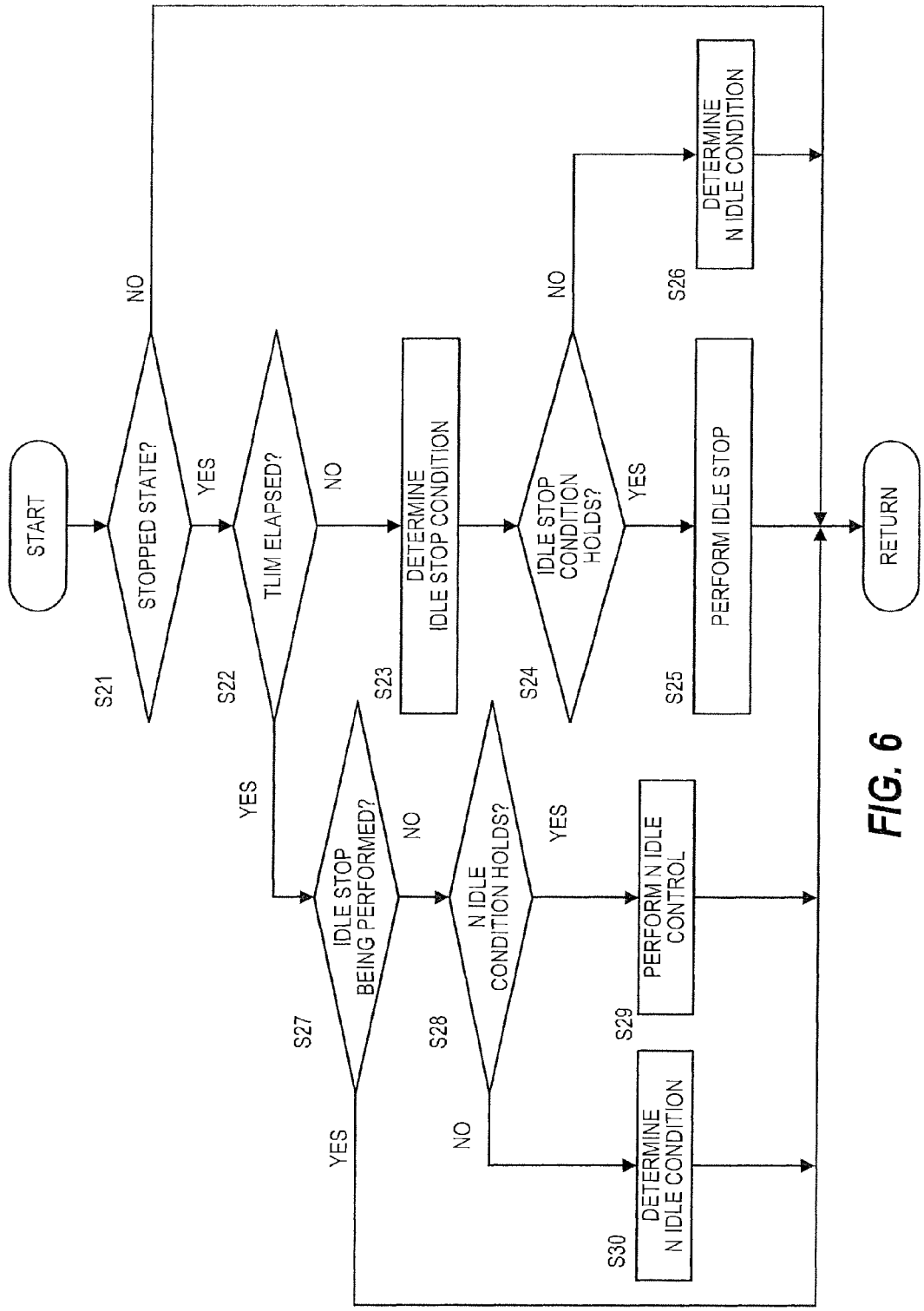
FIG. 6 is a flow chart showing the content of an idle stop control performed by a controller (second embodiment).

FIG. 6 is a flow chart showing the content of the idle stop control performed by a controller 12. The idle stop control according to the second embodiment is further described with reference to FIG. 6. This flow chart is repeatedly performed at every interval of a specified time (e.g. every 10 msec.).

In S21, the controller 12 determines whether or not the vehicle is in a stopped state (VSP=0). A process proceeds to S22 if the vehicle is in the stopped state while ending unless otherwise. When the process proceeds from S21 to S22 for the first time, a timer for measuring a stoppage time is started.

In S22, the controller 12 determines whether or not the stoppage time has exceeded a specified time TLIM. The process proceeds to S23 if the stoppage time is not in excess of the specified time TLIM while proceeding to S27 if the stoppage time is in excess of the specified time TLIM. A method for setting the specified time TLIM is as in the first embodiment.

In S23, the controller 12 determines an idle stop condition. Specifically, the controller 12 determines whether or not each of the above conditions a1 to a8 holds.

In S24, the controller 12 determines whether or not the idle stop condition holds. The controller 12 determines that the idle stop condition holds when all the above conditions a1 to a8 hold. The process proceeds to S25 if the idle stop condition is determined to hold while proceeding to S26 unless otherwise.

In S25, the controller 12 performs the idle stop of the engine 1. In other words, the controller 12 stops fuel supply to the engine 1 to stop the engine 1.

In S26, the controller 12 determines the N idle condition. The controller 12 determines whether or not each of the above conditions b1 to b7 holds.

S22 to S26 are repeated until the stoppage time exceeds the specified time TLIM and the idle stop is performed when the idle stop condition holds. As for the N idle control, only the determination of the conditions b1 to b7 is repeated.

On the other hand, the process proceeds to S27 when the stoppage time exceeds the specified time TLIM. In S27, the controller 12 determines whether or not the idle stop is being performed. If it is determined that the idle stop is being performed, the process directly ends to continue the idle stop as long as the idle stop condition holds even after the elapse of the specified time TLIM. The process proceeds to S28 if it is determined that the idle stop is not being performed.

In S28, the controller 12 determines whether or not the N idle condition holds. The controller 12 judges that the N idle condition holds when all of the above conditions b1 to b7 hold.

When the N idle condition holds, the process proceeds to S29 and the controller 12 performs the N idle control by reducing the hydraulic pressure supplied to the low brake 32. The process proceeds to S30 when the N idle condition does not hold.

In S30, the controller 12 determines whether or not the N idle condition holds. The controller 12 judges that the N idle condition holds when all of the above conditions b1 to b7 hold.

Thus, according to the above control, the N idle control is not performed even if the N idle condition holds before the stoppage time exceeds the specified time TLIM and when the idle stop condition does not hold.

Figure 7A:
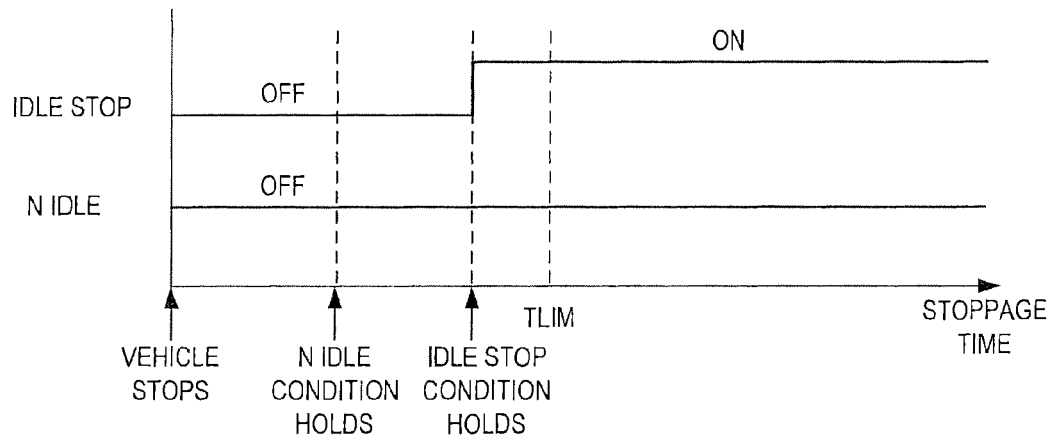
FIGS. 7A and 7B are time charts showing functions and effects of the second embodiment.

Determination as to whether or not the idle stop condition holds is repeated until the stoppage time exceeds the specified time TLIM and, when the idle stop condition holds, the engine 1 is automatically stopped at that timing (FIG. 7A). Since the N idle control is not performed at this time, a shock produced at the time of a switch from the N idle state to the idle stop state does not occur.

Figure 7B:
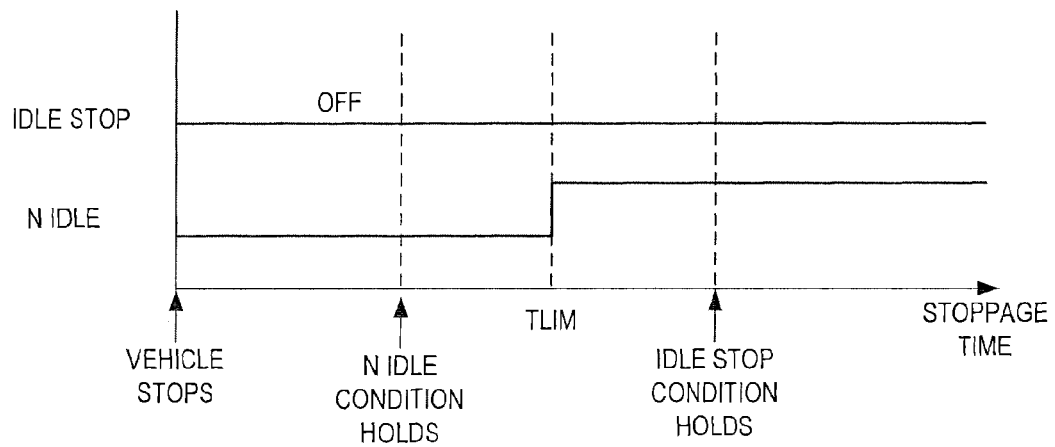

The N idle control is performed at a timing when the stoppage time reaches the specified time TLIM when the N idle condition holds even if the idle stop condition does not hold until the stoppage time exceeds the specified time TLIM (FIG. 7B).

As described above, since the state is not switched from the N idle state to the idle stop state according to the second embodiment, a shock at the time of the switch can be prevented. Since the N idle control is performed upon the elapse of the specified time TLIM when the N idle condition holds (when the N idle condition holds after the elapse of the specified time TLIM, the N idle control is performed at that timing) even if the idle stop condition does not hold before the elapse of the specified time TLIM, it is possible to reduce a fuel consumption amount during a stop of the vehicle and improve fuel economy.

Next, a third embodiment of the present invention is described.

In the second embodiment, the N idle control is not performed until the specified time TLIM elapses even when the N idle condition holds before the stoppage time exceeds the specified time TLIM for the purpose of avoiding a shock when the state is switched from the N idle state to the idle stop state. On the contrary, in the third embodiment, by prioritizing an improvement in fuel economy over shock prevention, the N idle control is immediately performed when the N idle condition holds. Thereafter, if the idle stop condition holds before the stoppage time exceeds the specified time TLIM, the N idle state is switched to the idle stop state at that timing.

Other points such as the overall construction of a vehicle, the prohibition of the idle stop when the stoppage time exceeds the specified time TLIM without the idle stop condition holding and the performance of the N idle control when the N idle condition holds after the stoppage time exceeds the specified time TLIM are the same as in the second embodiment.

Figure 8:
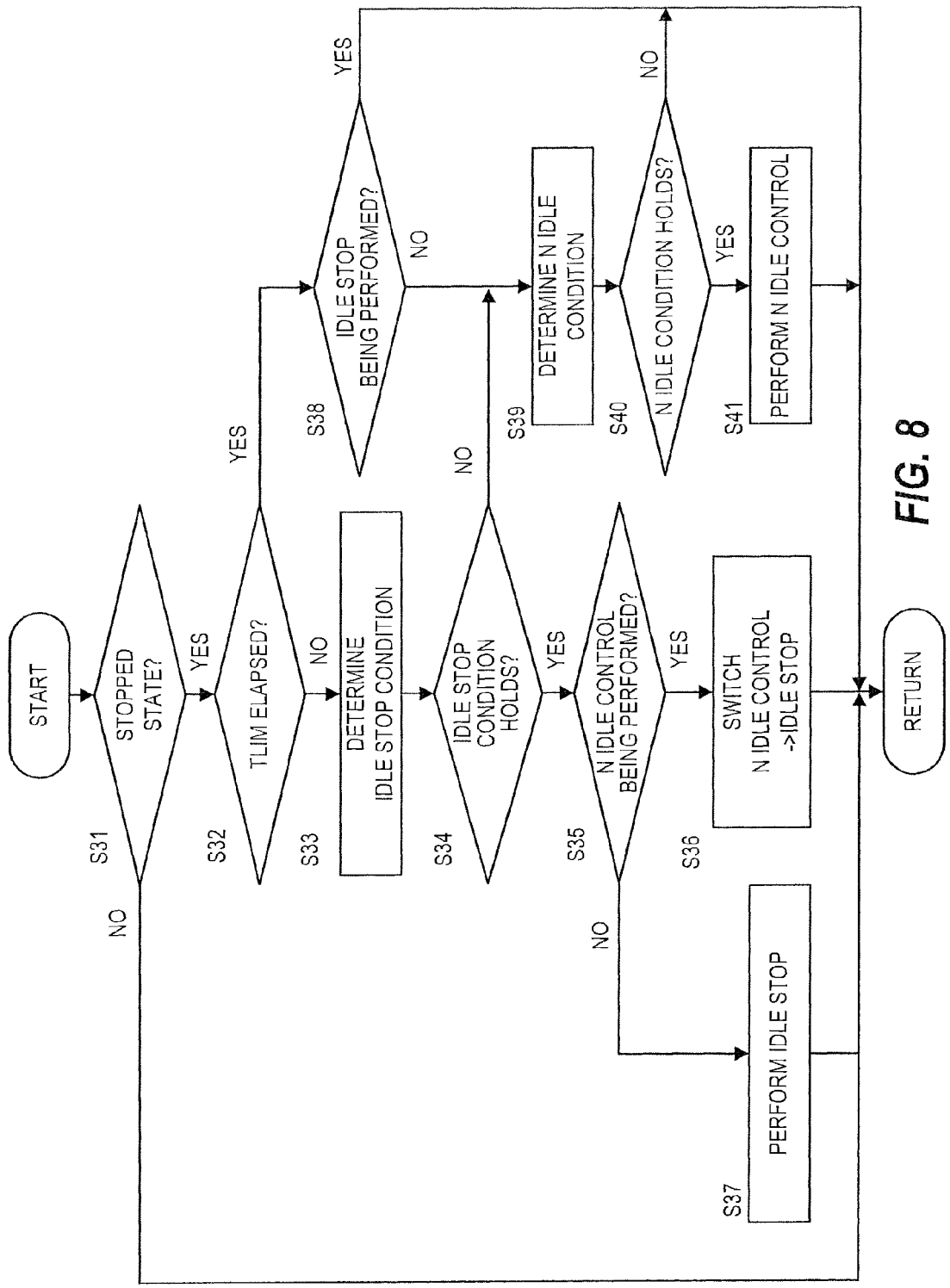
FIG. 8 is a flow chart showing the content of an idle stop control performed by a controller (third embodiment).

FIG. 8 is a flow chart showing the content of the idle stop control performed by a controller 12. The idle stop control according to the third embodiment is further described with reference to FIG. 8. This flow chart is repeatedly performed at every interval of a specified time (e.g. every 10 msec.).

In S31, the controller 12 determines whether or not the vehicle is in a stopped state (VSP=0). A process proceeds to S32 if the vehicle is in the stopped state while ending unless otherwise. When the process proceeds from S31 to S32 for the first time, a timer for measuring a stoppage time is started.

In S32, the controller 12 determines whether or not the stoppage time has exceeded a specified time TLIM. The process proceeds to S33 if the stoppage time is not in excess of the specified time TLIM while proceeding to S38 if the stoppage time is in excess of the specified time TLIM. A method for setting the specified time TLIM is as in the first embodiment.

In S33, the controller 12 determines an idle stop condition. Specifically, the controller 12 determines whether or not each of the above conditions a1 to a8 holds.

In S34, the controller 12 determines whether or not the idle stop condition holds. The controller 12 determines that the idle stop condition holds when all the above conditions a1 to a8 hold. The process proceeds to S35 if the idle stop condition is determined to hold while proceeding to S39 unless otherwise.

In S35, the controller 12 determines whether or not an N idle control is being performed. The process proceeds to S36 if it is determined that the N idle control is being performed while proceeding to S37 unless otherwise.

In S36, the controller 12 performs the idle stop to switch a state from an N idle state to an idle stop state after finishing the N idle control. Specifically, a low brake is completely engaged and, thereafter, fuel supply to an engine 1 is stopped to stop the engine 1.

In S37, the controller 12 performs the idle stop of the engine 1. In other words, the controller 12 stops fuel supply to the engine 1 to stop the engine 1.

On the other hand, in S38 which follows when the stoppage time is determined to have exceeded the specified time TLIM in S32, the controller 12 determines whether or not the idle stop is being performed. If it is determined that the idle stop is being performed, the process directly ends to continue the idle stop as long as the idle stop condition holds even after the elapse of the specified time TLIM. The process proceeds to S39 unless otherwise.

In S39 which follows if it is determined in S34 that the idle stop condition does not hold or if it is determined in S38 that the idle stop is not being performed, the controller 12 determines an N idle condition. The controller 12 determines whether or not each of the above conditions b1 to b7 holds.

In S40, whether or not the N idle condition holds is determined. The controller 12 determines that the N idle condition holds when all of the above conditions b1 to b7 hold. The process proceeds to S41 if the N idle condition is determined to hold while ending unless otherwise.

In S41, the controller 12 performs an N idle control by reducing a hydraulic pressure supplied to the low brake 32.

Thus, according to the third embodiment, the N idle control is immediately performed regardless of the stoppage time when the N idle control holds even if the idle stop condition does not hold. Thus, fuel economy can be improved as compared with the second embodiment.

Figure 9:
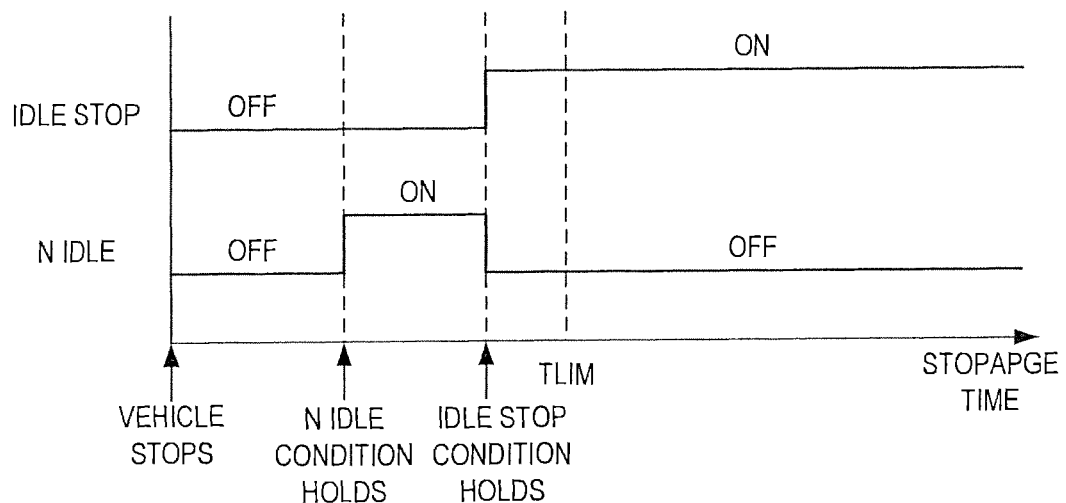
FIG. 9 is a time chart showing functions and effects of the third embodiment.

Even during the N idle control, at any time before the stoppage time exceeds the specified time TLIM, the N idle control is stopped and the idle stop having a better fuel economy improvement effect than the N idle control is performed when the idle stop condition holds. Thus, fuel economy can be further improved. FIG. 9 is a time chart showing a state at this time.

Although the engine 1 is stopped after the low brake 32 is completely engaged when the state is switched from the N idle state to the idle stop state in S36, the low brake 32 may be completely engaged after the engine 1 is stopped. By this, a shock at the time of the switch can be reduced.

The embodiments of the present invention have been described above. The above embodiments are merely illustration of application examples of the present invention and not of the nature to limit the technical scope of the present invention to specific constructions of the above embodiments. Various changes can be made without departing from the gist of the present invention.

For example, the transmission 4 is not limited to the one including a combination of the variator 20 and the sub-transmission mechanism 30. The transmission 4 may be an ordinary continuously variable transmission including no sub-transmission mechanism or a stepped automatic transmission. In this case, the frictional engagement element for start that reduces the transmittable torque at the time of the N idle control is a forward clutch of a forward/reverse switching mechanism.

This application claims priority based on Japanese Patent Application No. 2010-176097, filed with the Japan Patent Office on Aug. 5, 2010, the entire content of which is incorporated into this specification by reference.

What is claimed is:

1. An idle stop vehicle which performs an idle stop to automatically stop an engine during a stop of the vehicle, comprising:
   an idle stop condition determination unit configured to determine whether or not an idle stop condition holds; and
   an engine control unit configured to perform the idle stop when the idle stop condition holds before a stoppage time exceeds a specified time and to prohibit the idle stop after the stoppage time exceeds the specified time without the idle stop condition holding even once after a vehicle speed attains a stopped state.

2. The idle stop vehicle according to claim 1, further comprising:
   an automatic transmission for transmitting output rotation of the engine to drive wheels;
   an N idle control performance unit configured to perform an N idle control to reduce a transmittable torque of a frictional engagement element for start of the automatic transmission below a torque of the engine;

an N idle condition determination unit configured to determine whether or not an N idle condition which permits the N idle control holds; and a transmission control unit configured to cause the N idle control performance unit to perform the N idle control when the stoppage time reaches the specified time if the N idle condition holds and the idle stop condition does not hold before the stoppage time exceeds the specified time.

3. The idle stop vehicle according to claim 1, further comprising:

an automatic transmission for transmitting power of the engine to drive wheels;

an N idle control performance unit configured to perform an N idle control to reduce a transmittable torque of a frictional engagement element for start of the automatic transmission below a torque of the engine;

an N idle condition determination unit configured to determine whether or not an N idle condition which permits the N idle control holds; and a transmission control unit configured to cause the N idle control performance unit to perform the N idle control at a timing when the N idle condition holds before the stoppage time exceeds the specified time and when the idle stop condition does not hold.

4. The idle stop vehicle according to claim 3, wherein the transmission control unit is configured to end the N idle control by the N idle control performance unit and the engine control unit is configured to perform the idle stop at a timing when the idle stop condition holds while the N idle control is being performed by the N idle control performance unit and before the stoppage time exceeds the specified time.

5. The idle stop vehicle according to claim 1, wherein the idle stop condition determination unit and the engine control unit are embodied in a controller.

6. A control method for a vehicle which performs an idle stop to automatically stop an engine during a stop of the vehicle, comprising:

determining by a controller, whether or not an idle stop condition holds;

performing by the controller, the idle stop when the idle stop condition holds before a stoppage time exceeds a specified time; and prohibiting by the controller, the idle stop after the stoppage time exceeds the specified time without the idle stop condition holding even once after a vehicle speed attains a stopped state.

7. The control method according to claim 6, further comprising:

determining by the controller, whether or not an N idle condition which permits an N idle control holds, the N idle control being a control to reduce a transmittable torque of a frictional engagement element for start of an automatic transmission of the vehicle below a torque of the engine; and performing by the controller, the N idle control when the stoppage time reaches the specified time if the N idle condition holds and the idle stop condition does not hold before the stoppage time exceeds the specified time.

8. The control method according to claim 6, further comprising:

determining by the controller, whether or not an N idle condition which permits an N idle control holds, the N idle control being a control to reduce a transmittable torque of a frictional engagement element for start of an automatic transmission of the vehicle below a torque of the engine; and performing by the controller, the N idle control at a timing when the N idle condition holds before the stoppage time exceeds the specified time and when the idle stop condition does not hold.

9. The control method according to claim 8, further comprising:

ending by the controller, the N idle control and performing by the controller, the idle stop at a timing when the idle stop condition holds while the N idle control is being performed by the controller and before the stoppage time exceeds the specified time.

10. An idle stop vehicle which performs an idle stop to automatically stop an engine during a stop of the vehicle, comprising:

idle stop condition determination means for determining whether or not an idle stop condition holds; and engine control means for performing the idle stop when the idle stop condition holds before a stoppage time exceeds a specified time and prohibiting the idle stop after the stoppage time exceeds the specified time without the idle stop condition holding even once after a vehicle speed attains a stopped state.

11. The idle stop vehicle according to claim 10, further comprising:

an automatic transmission for transmitting output rotation of the engine to drive wheels;

N idle control performance means for performing an N idle control to reduce a transmittable torque of a frictional engagement element for start of the automatic transmission below a torque of the engine;

N idle condition determination means for determining whether or not an N idle condition which permits the N idle control holds; and transmission control means for causing the N idle control performance means to perform the N idle control when the stoppage time reaches the specified time if the N idle condition holds and the idle stop condition does not hold before the stoppage time exceeds the specified time.

12. The idle stop vehicle according to claim 10, further comprising:

an automatic transmission for transmitting power of the engine to drive wheels;

N idle control performance means for performing an N idle control to reduce a transmittable torque of a frictional engagement element for start of the automatic transmission below a torque of the engine;

N idle condition determination means for determining whether or not an N idle condition which permits the N idle control holds; and transmission control means for causing the N idle control performance means to perform the N idle control at a timing when the N idle condition holds before the stoppage time exceeds the specified time and when the idle stop condition does not hold.

13. The idle stop vehicle according to claim 12, wherein the transmission control means ends the N idle control by the N idle control performance means and the engine control means performs the idle stop at a timing when the idle stop condition holds while the N idle control is being performed by the N idle control performance means and before the stoppage time exceeds the specified time.

* * * * *